United States Patent
Kooijman et al.

(10) Patent No.: US 9,574,547 B2
(45) Date of Patent: Feb. 21, 2017

(54) METHOD AND APPARATUS FOR CONTROLLING AN OPERATIONAL PARAMETER OF A WIND TURBINE

(71) Applicant: General Electric Company, Schenectady, NY (US)

(72) Inventors: Henk-Jan Kooijman, Salzbergen (DE); Bastian Sundermann, Berlin (DE); Margret Kalter, Berlin (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 760 days.

(21) Appl. No.: 13/740,730

(22) Filed: Jan. 14, 2013

(65) Prior Publication Data
US 2014/0199169 A1 Jul. 17, 2014

(51) Int. Cl.
*F03D 7/02* (2006.01)

(52) U.S. Cl.
CPC .......... *F03D 7/0204* (2013.01); *F03D 7/0288* (2013.01); *F05B 2270/331* (2013.01); *Y02E 10/723* (2013.01)

(58) Field of Classification Search
CPC ..... F03D 7/0228; F03D 7/0268; F03D 7/0292
USPC ... 415/1, 4.1, 4.3, 4.5, 15, 33, 48–50; 416/1, 416/23, 37, 99, 141, 142, 147, 155, 194, 196 A, 416/196 R; 29/44, 45
See application file for complete search history.

(56) References Cited

U.S. PATENT DOCUMENTS

| | | | |
|---|---|---|---|
| 4,297,076 A * | 10/1981 | Donham | F03D 7/0228 416/24 |
| 7,118,339 B2 | 10/2006 | Moroz et al. | |
| 8,360,722 B2 * | 1/2013 | Hoffmann | F03D 11/0091 415/118 |
| 9,127,644 B2 * | 9/2015 | Friedrich | F03D 7/0228 |
| 2008/0001409 A1 * | 1/2008 | Schellings | F03D 7/0204 290/44 |
| 2010/0054939 A1 * | 3/2010 | Hoffmann | F03D 7/0204 416/10 |

* cited by examiner

*Primary Examiner* — Woody Lee, Jr.
(74) *Attorney, Agent, or Firm* — GE Global Patent Operation; Douglas D. Zhang (57) ABSTRACT

A method for operating a wind turbine is described. The wind turbine includes a tower having a tower axis, and a nacelle being rotatable about the tower axis. The method includes providing a data set of one or more operational parameters of the wind turbine. The one or more operational parameters depend on the angular position of the nacelle with respect to the tower axis. The method further includes determining an angular position of the nacelle with respect to the tower axis; selecting one or more operational parameters from the data set of one or more operational parameters of the wind turbine depending on the determined angular position of the nacelle; and applying the one or more selected operational parameters to the wind turbine. Further, another method of operating a wind turbine and a wind turbine are described.

14 Claims, 8 Drawing Sheets

METHOD AND APPARATUS FOR CONTROLLING AN OPERATIONAL PARAMETER OF A WIND TURBINE

BACKGROUND OF THE INVENTION

The subject matter described herein relates generally to methods and systems for controlling an operational parameter of a wind turbine, and more particularly, to methods and systems for controlling operational parameters of a wind turbine tailored to another operational parameter.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

In known wind turbines, the yaw angle of the wind turbine (i.e., the horizontal misalignment between wind and turbine pointing direction) can be adapted so that the energy yield is improved, e.g., when the wind changes its direction. By adapting the yaw angle to the actual wind angle, the power output is maximized.

However, the yaw angle of the wind turbine influences not only the energy yield, but also the amount of load on non-yawing support structure parts of a wind turbine (such as tower, bearings, and the like). The support structure parts of a wind turbine are designed corresponding to a peak value. For instance, the operational parameters of the wind turbine may be set so that the load on the structural parts does not exceed a predetermined peak value. That means for example that the wind turbine has to be shut off or curtailed in some cases in order to stay within the design load levels of the structural, non-yawing parts of the wind turbine.

Traditional design load calculations take the fatigue loading for the support structure by default as being axi-symmetric with respect to the yawing axis of the wind turbine. This may lead to the situation where the turbine support structure is over-dimensioned due to a directional variation in short-term and long-term wind conditions. It is therefore desirable to permit a better use of the turbine fatigue reserve margins and a higher energy production by capturing more power for various wind directions.

BRIEF DESCRIPTION OF THE INVENTION

In one aspect, a method for operating a wind turbine is provided. The wind turbine includes a yawing part being yaw angle variable about a yaw axis of the wind turbine, a support structure for supporting the yawing part of the wind turbine, and a load control for controlling an operational parameter of the wind turbine having an influence on the load on the support structure of the wind turbine. The method for operating a wind turbine includes determining the wind direction and adjusting the load control during operation of the wind turbine dependent on the wind direction.

In another aspect, a method for operating a wind turbine is provided. The wind turbine includes a tower having a tower axis, and a nacelle being rotatable about the tower axis. The method for operating a wind turbine includes providing a data set of one or more operational parameters of the wind turbine. Typically, the one or more operational parameters depend on the angular position of the nacelle with respect to the tower axis. The method further includes determining an angular position of the nacelle with respect to the tower axis; selecting one or more operational parameters from the data set of one or more operational parameters of the wind turbine depending on the determined angular position of the nacelle; and applying the one or more selected operational parameters to the wind turbine.

In yet another aspect, a wind turbine is provided. The wind turbine includes a tower including a tower axis; a nacelle being rotatable about the tower axis; and a determining device for determining an angular position of the nacelle with respect to the tower axis. Further, the wind turbine includes a control unit for recording and storing a data set of one or more operational parameters of the wind turbine over its operational lifetime, wherein the one or more operational parameters depend on the angular position of the nacelle. Typically, the control unit is adapted for selecting one or more operational parameters from the data set of one or more operational parameters of the wind turbine depending on the determined angular position of the nacelle and applying the one or more selected operational parameters to the wind turbine Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

According to some embodiments described herein, a wind turbine is operated according to a data set of operational parameters in which the operational parameters of the wind turbine are given for a certain angular position of the nacelle with respect to the tower axis. The embodiments described herein include a wind turbine system that provides a better use of the turbine fatigue reserve margins and a higher energy capture. More specifically, the wind turbine and the methods according to embodiments herein will lead to an overall higher energy capture by using wind turbine control settings that are dependent on the wind direction. In addition, the support structure parts of a wind turbine may be dimensioned so as to fit to the improved energy capture and to avoid over-dimensioning of the support structure of the wind turbine, according to embodiments described herein.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

The term "peak shaver" as used herein should be understood as a control feature of the wind turbine. Generally, the basic principle of a peak shaver is a turbine control feature whereby the thrust force on the turbine is regulated by influencing an operational parameter of the wind turbine, such as pitching of the rotor blades. As an example, most pitch-regulated wind turbine controllers apply pitching of the blades towards feathering in the order of one to several degrees when moving up in the knee of the power curve, e.g. between 75% and 100% of rated power, in order to mitigate the turbine thrust loading while partly sacrificing on maximum power capture. The design of the peak shaver generally offers a trade-off between minimizing the design thrust loading on the one hand and maximum power capture on the other hand. The peak shaver principle is also known as thrust-clipper.

Figure 1:
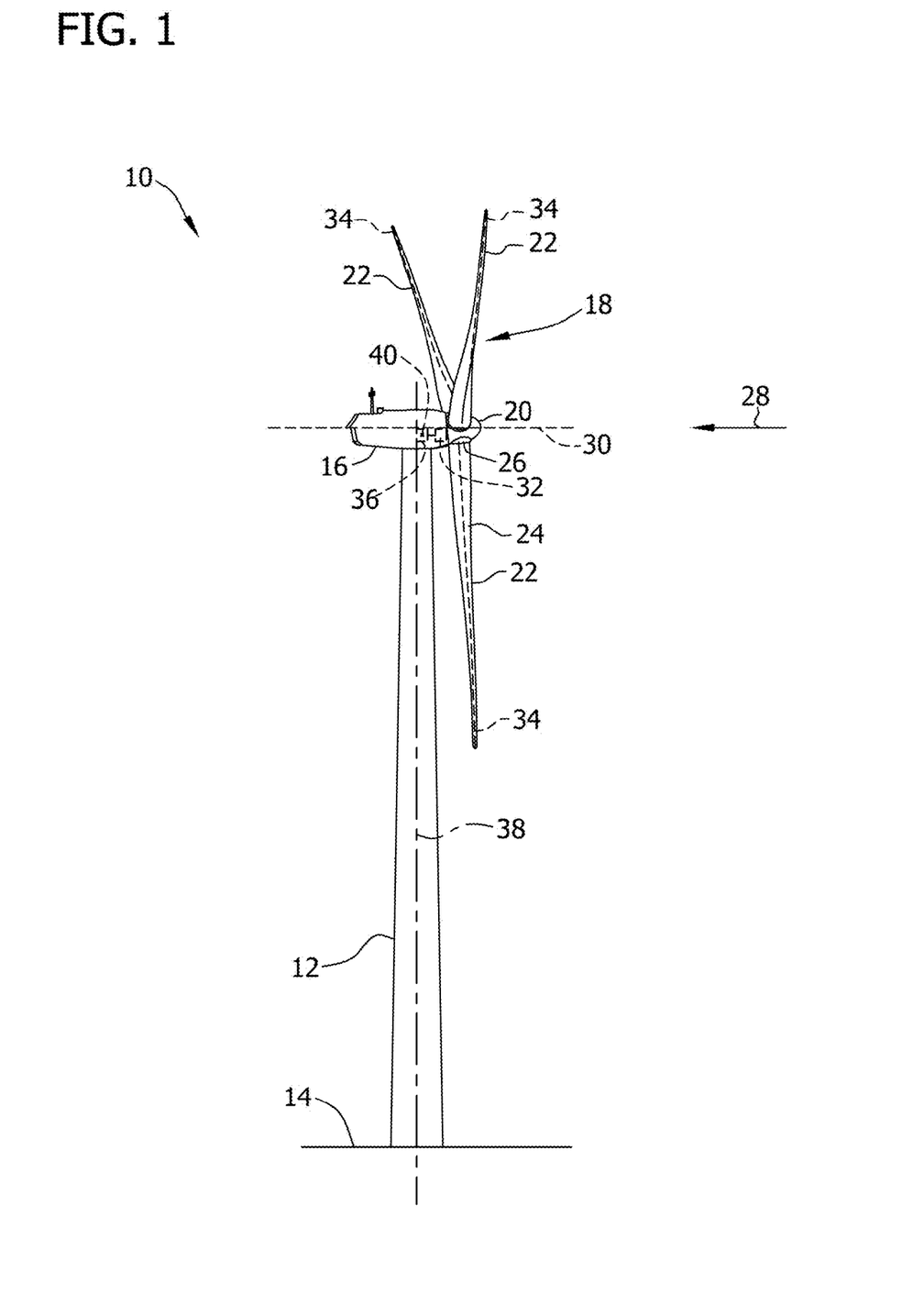
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change the blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28. Typically, the yaw axis coincides with the tower axis of the wind turbine.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard.

Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor or processors. RAM and storage devices can also be used to store and provide temporary variables, static (i.e., non-changing) information and instructions, or other intermediate information to the processors during execution of instructions by the processor or processors. Instructions that are executed may include, without limitation, wind turbine control system control commands.

Figure 2:
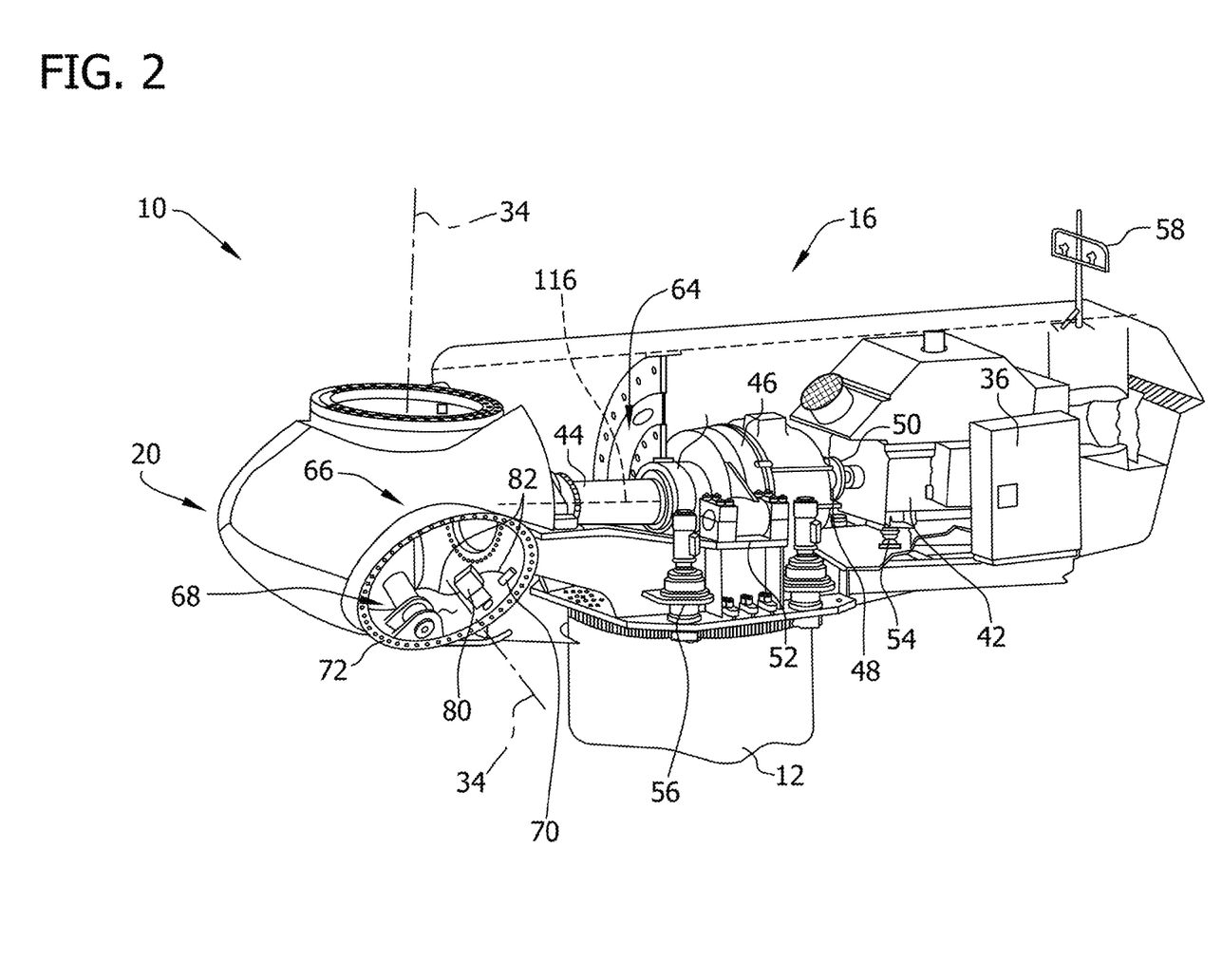
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 which is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 which subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34.

Pitch drive system 68 is coupled to control system 36 for adjusting the blade pitch of rotor blade 22 upon receipt of one or more signals from control system 36. In the exemplary embodiment, a pitch drive motor is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. In one embodiment, when rotor 18 operates at rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

Figure 3:
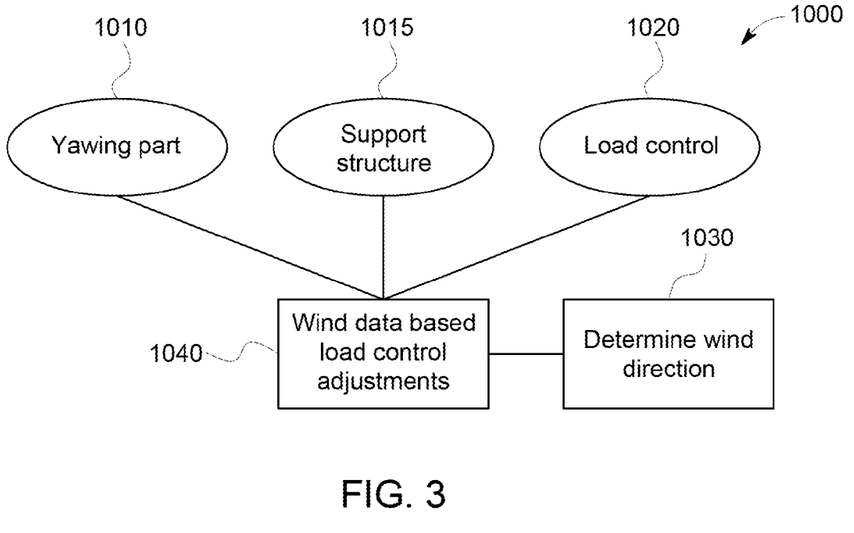
FIG. 3 is a schematic flow chart of a method of operating a wind turbine according to embodiments described herein.

FIG. 3 shows an embodiment of a method for operating a wind turbine. Typically, the wind turbine includes a yawing part 1010 being yaw angle variable about a yaw axis, a support structure 1015 for supporting the yawing part of the wind turbine, and a load control 1020 for controlling an operational parameter of the wind turbine having an influence on the load on the support structure of the wind turbine. The support structure may be understood as components of the wind turbine which support the yawing parts of the wind turbine, whilst at the same time not being yawing. For instance, the support structure of the wind turbine may include the tower of the wind turbine, bearings supporting the yawing parts of the wind turbine, the basis of the wind turbine in the ground or foundation and the like.

According to some embodiments, the wind turbine may also include a control unit adapted for recording and storing data and for controlling an operational parameter of the wind turbine, e.g. by sending and receiving control signals, calculating desired measures, and monitoring the operational parameters of the wind turbine.

In block 1030, the wind direction is determined. Typically, the wind direction may be determined by measuring the wind direction at the site where the wind turbine is located for obtaining site-specific, current data over the operational lifetime of the wind turbine. In block 1040, the load control of the wind turbine is adjusted during operation of the wind turbine dependent on the determined wind direction. Typically, the adjustment of the load control in block 1040 is performed dependent on the comparison of the determined wind direction and data of a wind characteristic being wind direction dependent. According to some embodiments, the load control may be part of a control unit of the wind turbine, such as a control unit as described above. Typically, the load control is adjusted so as to equalize the load on the support structure, e.g., by equalizing the load at different circumferential positions of the support structure of the wind turbine.

According to some embodiments, the method of operating a wind turbine further includes determining the yaw angle, and adjusting the load control includes adjusting the load control dependent on the yaw angle. Typically, the yaw angle is determined by a yaw angle control being part of the wind turbine or the control unit of the wind turbine. The yaw angle control may control the movement of the yawing parts of the wind turbine about the yaw axis of the wind turbine.

In known wind turbines, the load calculations take the fatigue loading for the support structure by default as axi-symmetric. As a consequence, load control measures like a peak shaver, as known in the art, are independent of the yaw direction. Using stored data being dependent on the angular position of the nacelle, according to embodiments described herein, allows for a more effective use of the fatigue structural strength of the support structure. Typically, the peak shaver settings may be made dependent on the yaw angle of the wind turbine.

According to some embodiments described herein, block 1040 may also include comparing the yaw angle of the wind turbine with data of a wind characteristic in a look-up table of operational parameters of the wind turbine stored in the control unit of the wind turbine. The look-up table may be generated and stored before the wind turbine is used or may also be updated from time to time so as to keep the data at an actual level. Typically, the look-up table may include data allowing the control unit to decide which amount one or more operational parameters should have in the present situation. For instance, the yaw angle may be used to determine the actual position of the wind turbine. The actual position may be used to get access to data of a wind rose. Typically, the data in the wind rose may be the basis for determining or calculating a desired, or optimized operational parameter (such as the pitch angle).

Figure 4:
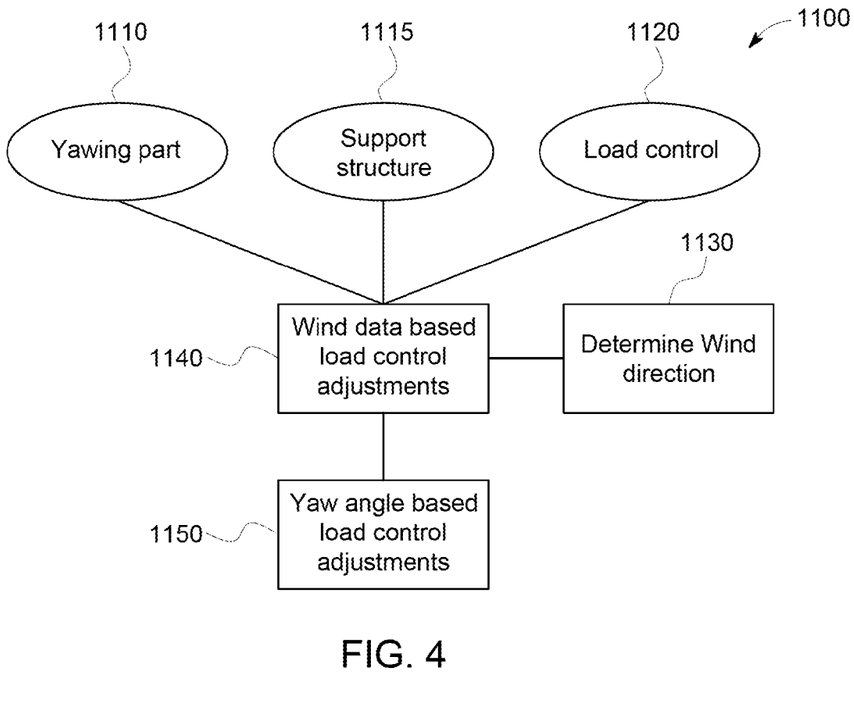
FIG. 4 is a schematic flow chart of a method of operating a wind turbine according to embodiments described herein.

FIG. 4 shows an embodiment of a method 1100 for controlling the operation of a wind turbine. Typically, blocks 1110, 1115, 1120, 1130, and 1140 may correspond to blocks 1010, 1015, 1020, 1030, and 1040, respectively. In the embodiment shown in FIG. 4, the method 1100 further includes block 1150, which further specifies the adjustment of the load control. Typically, the load control is performed so that the load on the support structure is substantially axi-symmetric with respect to the yaw axis of the wind turbine during operation of the wind turbine in block 1150. Typically, by applying the described embodiments of the method, the load on the support structure of the wind turbine may be substantially equally distributed over the various yaw directions, which allows for peak shaver settings to increase the overall higher energy capture of the wind turbine.

In this context, the term "substantially" used herein may mean that there may be a certain deviation from the characteristic denoted with "substantially." For instance, the term "a substantially axi-symmetric distribution" may refer to a load distribution which may have a certain deviation from the exact axi-symmetric shape, such as a deviation of about 1% to 10% of the general fatigue load amount in one direction. According to a further example, the term "substantially independent from a parameter" may refer to a situation, where the influence of the parameter is smaller than the influence of other parameters. In particular, the influence of the parameter, of which the described term is independent, may be so small that the influence is not immediately recognizable in view of the influence of other parameters. Typically, the parameter of which the described term is independent may have no influence on the described term.

According to some embodiments, which may be combined with other embodiments described herein, the load control may include a peak shaver, as explained in detail above. In other words, the load control may be performed by setting peak shaver settings so as to influence the load distribution on the support structure of the wind turbine. Typically, the load control is adjusted by influencing (such as controlling) an operational parameter of the wind turbine. Typically, the load control may be adapted to control operational parameter of the wind turbine having an influence on the load distribution on the support structure of the wind turbine.

Typically, the operational parameter of the wind turbine as described herein may include the pitch angle, the rotational speed of the rotor, the torque of the rotor, and/or the power In one embodiment, adjusting the load control is performed by changing the pitch angle. The change of the pitch angle may include calculating a desired value of the pitch angle and comparing the desired value of the pitch angle with the actual value of the pitch angle. When a desired pitch angle is calculated, preferably after determining the yaw angle, the actual pitch angle may be compared to the desired pitch angle. The pitch angle may for instance be calculated by the control unit, such as by a look-up table stored in the control unit. The comparison of the actual pitch angle and the desired pitch angle may be used to determine measures to reach the desired pitch angle. For instance, the comparison of the actual pitch angle and the desired pitch angle shows that the actual pitch angle is unnecessarily large for the present situation or wind condition. The control unit may in this case send a signal to the pitch control to lower the pitch angle and, thereby, increasing the power capture.

Typically, changing the pitch angle may include changing the pitch angle of the wind turbine so that the load on the support structure is substantially independent from the wind direction and/or the yaw angle. The support structure may be adapted to the operation of the wind turbine according to embodiments described herein.

Figure 5:
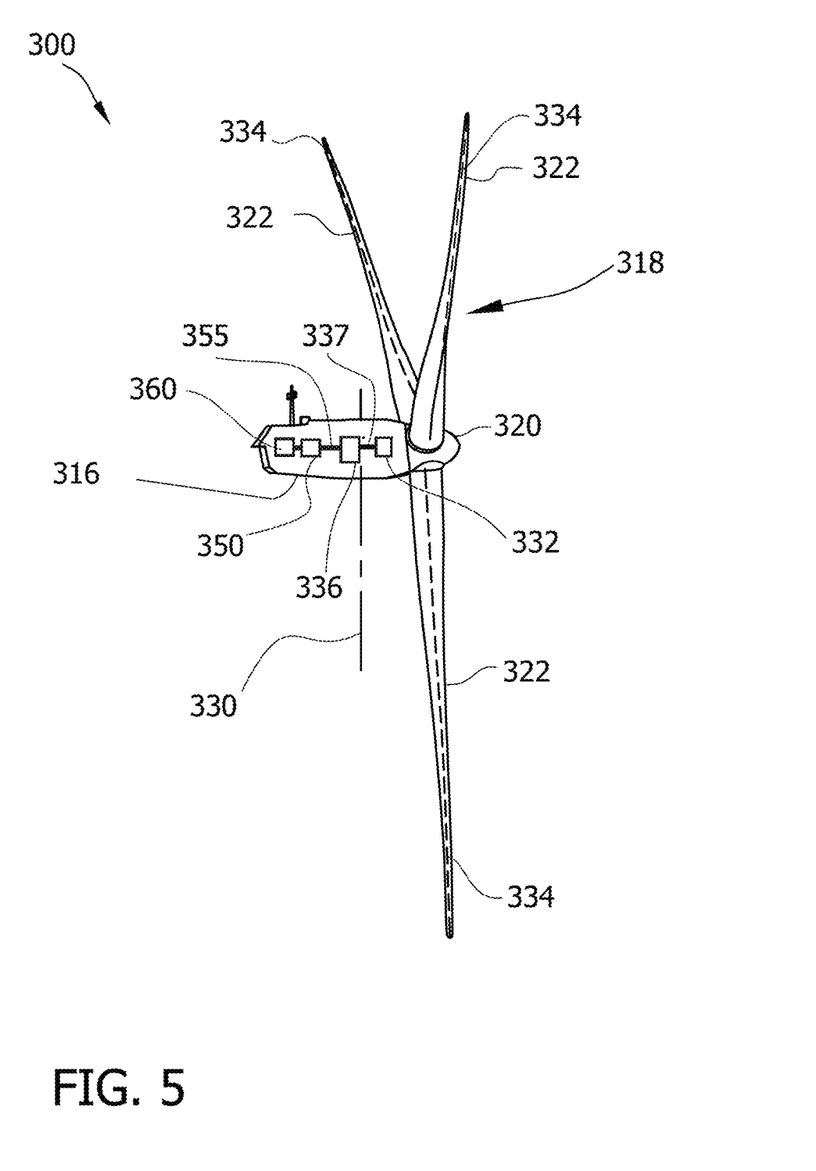
FIG. 5 is an enlarged sectional view of a nacelle and a rotor of a wind turbine according to embodiments described herein.

FIG. 5 shows a part of a wind turbine 300 according to embodiments described herein. Typically, the wind turbine 300 shown in FIG. 5 may be used to perform the methods as described herein. The shown section includes a nacelle 316 and a rotor 318 with the rotor hub 320. Typically, the rotor 318 is connected to the nacelle 316, as described above in detail with respect to FIG. 1. The rotor 318 includes rotor blades 322 and pitch axes 334. Further, a tower axis 330, which may also be a yawing axis or an axis of rotation of the nacelle 316 is shown in FIG. 5. Typically, the wind turbine may include a determining device 360 for determining an angular position of the nacelle 316 with respect to the tower axis 330.

According to some embodiments described herein, the wind turbine 300 also includes a control unit 336. The control unit may typically be a control unit as described above with respect to FIGS. 1 and 2. Typically, the control unit as described herein is adapted to record and store a data set of one or more operational parameters of the wind turbine over the operational lifetime of the wind turbine. Typically, the one or more operational parameters in the data set depend on the angular position of the nacelle 316. In one embodiment, the one or more operational parameters dependent on the angular position of the nacelle are stored in a look-up table. The control unit in a wind turbine according to embodiments described herein may be adapted for selecting one or more operational parameters from the data set of one or more operational parameters depending on the determined angular position of the nacelle. Further, the control unit may be adapted for applying the one or more selected operational parameters to the wind turbine.

Typically, the determining device 360 may be connected to the control unit 336 of the wind turbine and to further components of the wind turbine, such as measurement devices or the like. According to some embodiments, the determining device may use an angle meter in order to determine the angular position of the nacelle 316 with respect to the tower axis 330.

The embodiment of a wind turbine shown in FIG. 5 also includes a yaw angle control 350. The yaw angle control as referred to herein may be adapted for controlling a yaw drive mechanism as exemplarily described above. Typically, the yaw control 350 may be able to determine and control the yaw angle of the wind turbine 300 around yaw axis 330.

According to some embodiments, the angular position of the nacelle may be determined by measuring the wind direction and determining the yaw angle of the wind turbine. The determining device 360 may gather the information about the wind direction and the yaw angle and may determine the angular position of the nacelle 316 with respect to the tower axis 330 on the basis of the wind direction and the yaw angle. Typically, the control unit may be adapted for using the determined yaw angle for determining the angular position of the nacelle with respect to the tower axis. In some embodiments, the determined yaw angle may serve as a parameter for estimating an operational parameter of the wind turbine to be modified and applied to the wind turbine.

Typically, the control unit 336 of the wind turbine 300 may also be adapted for applying an operational parameter to the wind turbine by comparing, calculating, and controlling the operational parameter of the wind turbine. The control unit 336 may for instance receive signals allowing comparing an actual value of an operational parameter with a reference value of the operational parameter. Typically, the control unit may be adapted for sending respective control signals in order to set or influence the operational parameter.

In one embodiment, which may be combined with other embodiments described herein, applying an operational parameter may include modifying the operational parameter. For instance, modifying the selected operational parameter may include modifying the operational parameter so as to correspond to a predetermined nominal value of the operational parameter in the given situation the wind turbine is in.

The control unit 336 is exemplarily shown as being located in the nacelle 316 in FIG. 5, but may also be placed in another, suitable component of the wind turbine 300. According to some embodiments, the control unit may be a remote control unit, which is adapted to send respective control signals to the wind turbine.

As described above, the wind turbine may typically include a yawing part being yaw angle variable about the tower axis 330 and a support structure for supporting the yawing part of the wind turbine. For instance, the yawing part may be the nacelle 316 with the rotor hub 320 and the rotor 318. Typically, the control unit of the wind turbine may be adapted for applying the selected operational parameter of the wind turbine so that the load on the support structure is substantially axi-symmetric with respect to the tower axis 330 of the wind turbine 300 during operation of the wind turbine.

According to some embodiments, the wind turbine may include a wind characteristic determining device for determining an actual wind characteristic and/or a measuring device for measuring characteristic so as to determine sea state data. In some embodiments, the wind characteristic determining device may be a measurement device for measuring or sensing a wind characteristic, such as a meteorological mast 58 as described above, or the like. Typically, the wind characteristic determining device and/or the measuring device for the sea characteristics may be connected to the control unit 336 of the wind turbine 300 or may even (partly or entirely) be a part of the control unit 336.

Generally, wind characteristics as described herein may include data like the wind direction, the wind velocity, the wind turbulence, the air density, the air temperature, wind shear characteristics, the mean wind occurrence, the upflow and downflow characteristic of the wind, and site-specific wind data. In this context, the term "mean wind occurrence" should be understood as a mean value of the wind occurrence determined over a defined period of time. Further, the terms "upflow and downflow characteristics" of the wind are intended to be understood as a characteristic of the wind relating to the inclination of the wind flow with respect to the horizontal. The wind characteristic may generally depend on the location of the wind turbine and site-specific conditions. Typically, a wind characteristics may be stored in a wind rose, as explained in detail below with respect to FIGS. 6 and 7.

Figure 6:
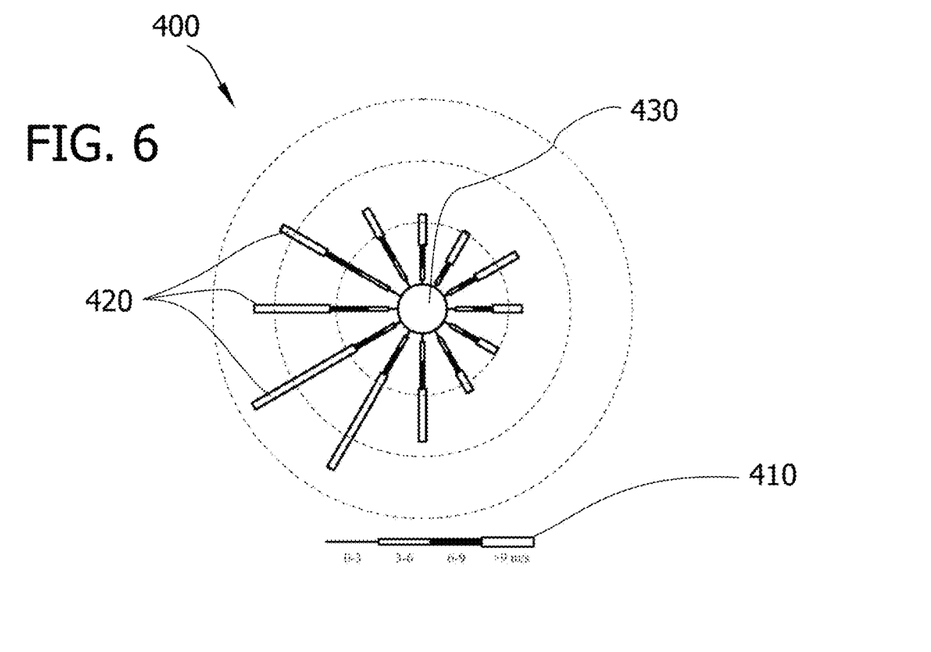
FIG. 6 is a schematic view of a wind rose used in a method of operating a wind turbine according to embodiments described herein.
Figure 7:
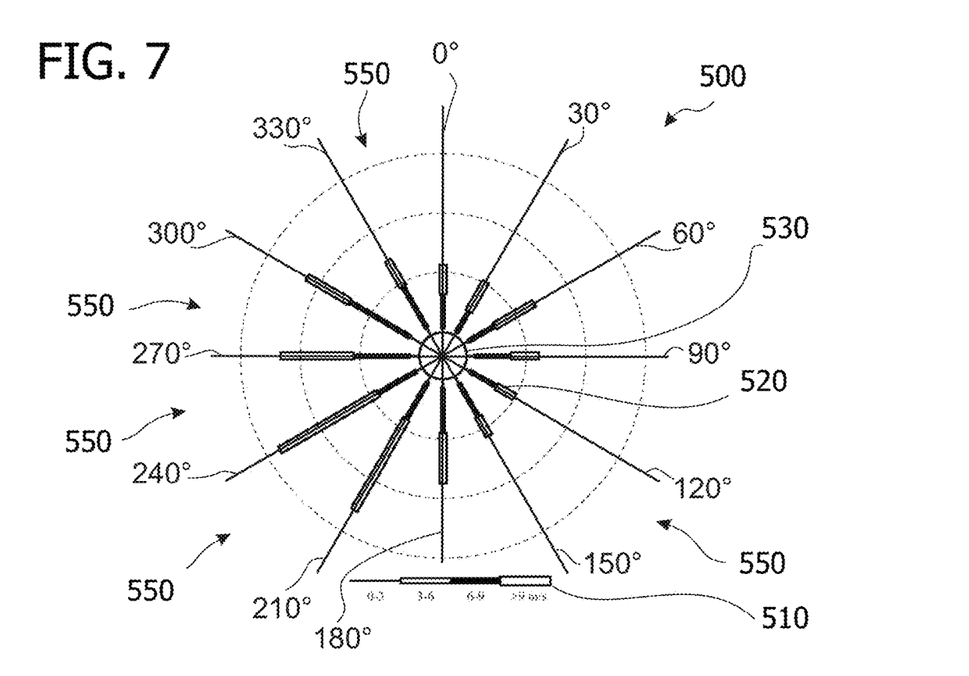
FIG. 7 is a schematic view of a wind rose used in a method of operating a wind turbine according to embodiments described herein.

Typically, a sea characteristic used to determine sea state data may include wave height, wave frequency, sea current occurrence, sea current velocity, sea current direction and the like. Also, the sea state may be stored in a diagram as shown in FIGS. 6 and 7, as explained in detail below.

Figure 8:
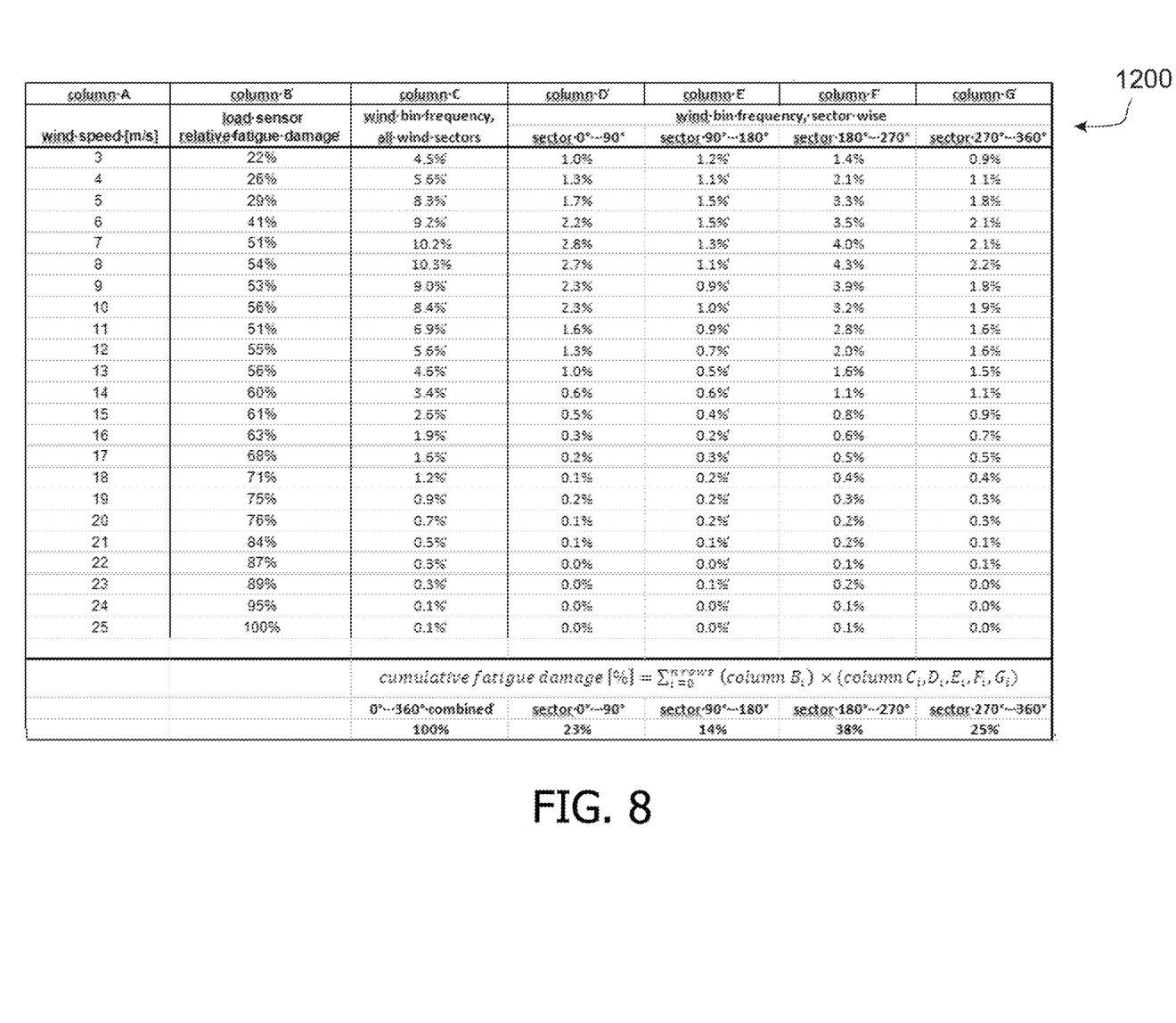
FIG. 8 shows an example of a table showing the load distribution in a wind turbine according to embodiments described herein.

According to some embodiments, with the wind characteristic and/or the sea characteristic being determined, the control unit of the wind turbine as described herein may be adapted for recording and storing the data set of the one or more operational parameters dependent on the angular position of the rotor, a wind characteristic and/or a sea characteristic. For instance, the control unit may be adapted to record data over the operational lifetime of the wind turbine and store the recorded data. Typically, the data recorded and stored (such as data concerning an operational parameter of the wind turbine, a wind characteristic and/or sea characteristics) may be updated in a certain time interval. For instance, the data may be updated about every three months, as explained in detail below with respect to FIG. 8.

For instance, the data set of operational parameter may be dependent on the angular position of the nacelle and a wind characteristic and/or a sea characteristic. According to some embodiments, the wind direction may be used to determine the angular position or may even be one of the wind characteristics on which the data set of operational parameters is additionally dependent.

As mentioned above, the wind turbine 300 as shown in FIG. 5 may have pitch axes 334 about which the rotor blades may pivot. According to some embodiments described herein, the selected operational parameters of the set of one or more operational parameters may include the pitch angle. Typically, in particular in the case that the pitch angle is included in the data set of operational parameters, a pitch control 332 is provided in order to influence the declination of the rotor blades 322 about pitch axes 334, e.g. by controlling and influencing a pitch adjustment system. An example of a pitch adjustment system is described in detail with respect to FIGS. 1 and 2, which may also be used in the embodiment of FIG. 5.

According to embodiments described herein, the operational parameter of the wind turbine in the data set of one or more operational parameters may include the pitch angle of the rotor blades of the wind turbine, the rotational speed of the rotor, the torque of the rotor, and/or the power.

In one embodiment, the yaw control and/or the pitch control may be located in the control unit or may be part of the control unit. For instance, in the case that the yaw angle control and the pitch angle control are part of the control unit of the wind turbine, the yaw angle control and the pitch angle control may be connected by the superior operation of the control unit.

According to some embodiments described herein, the pitch control 332 is connected to the control unit 336 via a connection 337. In particular, the pitch control 332 is connected to the control unit that is in turn connected to the yaw control 350. Typically, the yaw control 350 is connected to the control unit 336 via connection 355. According to some embodiments described herein, connections 337 and 355 may be signal lines, such as signal lines being adapted for transferring information between the connected parts.

Due to the connection between the control unit 336 and the yaw control 350 as well as the pitch control 332, it is possible to influence the pitch control dependent on the yaw control. When the pitch angle is the selected operational parameter in the method of operating a wind turbine and when the yaw control is used for determining the angular position of the nacelle with respect to the tower axis, the pitch angle may be influenced dependent on the yaw angle. According to some embodiments, the control unit is adapted for adjusting the control of the pitch control dependent on the angular position of the nacelle.

Typically, a wind characteristic, on which the data set of one or more operational parameters may be dependent according to some embodiments described herein, may be stored in a diagram like a wind rose. In FIG. 6, an example of such a diagram in form of a wind rose 400 is shown. The wind rose 400 shows a scale 410, which indicates—in this special case and as an example only—the wind velocity. The wind rose 400 shows a plurality of velocity bars 420, which indicate the wind velocity in a circle around a center 430, which may typically be a wind turbine. The length of the bars are indicative for the wind velocity, i.e., the longer a bar, the faster the wind. In the wind rose 400, of FIG. 6, consistently different wind velocity distributions depending on wind direction can be seen, forming a non-symmetric wind rose. According to embodiments described herein, the distribution of the wind velocity as shown in the wind rose 400 has an impact on the load on the support structure of the wind turbine. The wind velocity distribution of FIG. 6 exemplarily shows that the cumulative fatigue loading on the turbine parts that are not yawing (such as the support structure of the wind turbine) is not axi-symmetric because the wind loading is not (unless in the hypothetic case that the wind rose including all wind related properties is fully axi-symmetric).

FIG. 7 shows an embodiment of a wind rose 500, which is similar to the wind rose 400 of FIG. 6. Again, the wind velocity is shown in a scale 510 as an example of a wind characteristic. Typically, wind velocity bars 520 are distributed around the center 530. In the embodiment shown in FIG. 7, the wind rose 500 is divided in several sections 550, each of which encompasses exemplarily 30°. For example, as can be seen in FIG. 7, the sector 180° to 270° has a wind velocity and turbulence distribution that yields higher fatigue loads on the support structure of the wind turbine relative to the more benign sector between 270° and 180°. Typically, the information in the wind rose can be based on for example SCADA recordings, or studies of the ambient wind that were carried out before the installation of the wind turbine. The fatigue loading on the support structure (which may also be denoted as all non-yawing structural elements) will hereby be lower for the 270° to 180° sector relative to the 180° to 270° sector.

For example, assuming that standard wind turbine peak shaver settings are described as a relative 4° change in pitch angle between 80% and 100% power, independent of yaw angle. (The lower the relative pitch angle, the sharper the knee of the power curve and power capture.) For the non-symmetric wind rose described above this may now be altered to a 5° relative change in pitch angle for the highly loaded wind sector and to 2° for the remaining more benign wind sector. The wind rose tailored peak shaver settings based on an equal distribution of the fatigue loading over the various yaw directions (and, thus, angular positions of the nacelle with respect to the tower axis) will lead to an overall higher energy capture.

Typically, the control unit may use the wind rose as a wind characteristic which the data set of operational parameters is dependent on for a maximized energy yield and a uniform load distribution.

Typically, the wind roses shown in FIGS. 6 and 7 only exemplarily refer to the wind velocity. The wind data stored in a wind rose as an example of a wind characteristic used in embodiments described herein may also include other characteristics of the wind, e.g., the wind turbulence, the air density, the air temperature, wind shear characteristics, the mean wind occurrence, the upflow and downflow characteristic of the wind, and site-specific wind data.

In a further embodiment, in particular in the case that the wind turbine is an offshore wind turbine, sea state data may also be taken into account by the control unit of the wind turbine when performing the method of operating a wind turbine as described herein. For instance, sea state data, like wave occurrence, wave height, wave frequency, sea current may be used to operate the wind turbine in an efficient way. Thus, in the case that sea characteristics are determined and the operational parameter is stored in dependence on the sea state data, a diagram as shown in FIGS. 6 and 7 may also be used to store data of the sea characteristic such as, for instance, the sea current velocity.

To take advantage of the fact that the wind rose is typically non-axi-symmetric and, thereby, also the fatigue loading on the non-yawing part of the structure depends on the yaw position, the turbine load control settings may be made dependent on the turbine yaw direction in embodiments described herein, as explained above. An example for the fatigue loading on a turbine tower base according to embodiments described herein, is shown in table 1200 of FIG. 8. In column A of FIG. 8 the wind velocities 3 m/s to 25 m/s are shown, which reflect a typical turbine operating envelope. In column B, a normalized virtual damage equivalent fatigue loading (DEL) distribution is given as function of the wind velocity. In column C, the frequency per wind velocity is listed, which is subdivided per 90° wind sector in columns D to G. At the bottom of the columns C to G, the DEL values are given, again normalized, which are derived by multiplying column B with columns C to G, respectively, and then summarizing the results. So for columns D to G, the fatigue damage is weighted per wind sector and in column C it is accumulated for all wind directions. Even for the dominant wind sector, which is in this example 180° to 270°, the fatigue damage is only 38% relative to the fatigue damage if it is entirely attributed to one direction. This result indicates the entitlement of applying 'fatigue damage related turbine controller settings' as for example a peak shaver that is set dependent on the wind rose, as described in embodiments herein, especially with respect to FIGS. 3 and 4. To further elaborate on this, initial controller settings may be defined based on an assumed wind rose for the specific turbine location. Typically, the controller settings can be adjusted for example every quarter of a year depending on the calculated cumulative incurred fatigue damage per sector by combining the actual operating hours per wind speed and wind direction with a pre-calculated fatigue DEL per wind speed like is given as an example in column C. This last value may be replaced by a measured sensor or pseudo signal value, if available.

Figure 9:
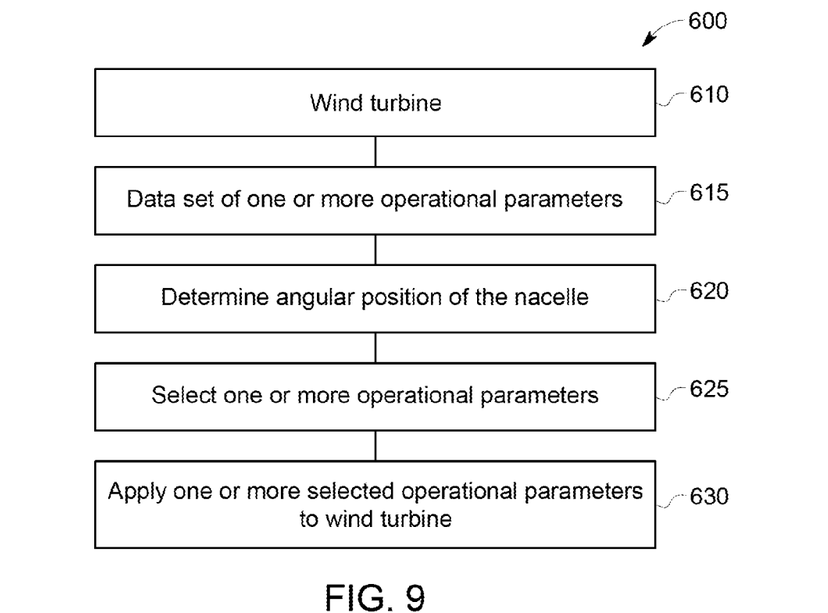
FIG. 9 is a schematic flow chart of a method of operating a wind turbine according to embodiments described herein.

According to some embodiments, the wind turbine and the data set of operational parameters as described above may be used in a method for operating a wind turbine. An example of such a method 600 is shown in FIG. 9. According to some embodiments, a wind turbine is provided in block 610, which typically includes a tower having a tower axis, and a nacelle being rotatable about the tower axis. Further, the wind turbine may include a rotor, a generator connected to the rotor, and a control unit for controlling the operation of the wind turbine. Typically, the wind turbine as described in block 610 may be a wind turbine as described above, for instance in FIG. 5 including a yaw control, a pitch control and the like. In the example of a method for operating a wind turbine shown in FIG. 9, a data set of one or more operational parameters of the wind turbine is provided in block 615. According to some embodiments, the one or more operational parameters depend on the angular position of the nacelle with respect to the tower axis.

Typically, in block 620, an angular position of the nacelle with respect to the tower axis is determined. For instance, the angular position may be determined by an angle meter or may be calculated by determining the yaw angle of the wind turbine and the actual wind direction. The actual wind direction may be determined by using measurements of the wind direction. Typically, the yaw angle may be determined by sending and receiving data from the yaw control and/or, the control unit of the wind turbine or the like. According to some embodiments, one or more operational parameters from the data set of one or more operational parameters of the wind turbine provided in block 615 may be selected in block 625. In other words, at least one parameter in the data set of operational parameters being dependent on the angular position of the wind turbine is selected to be set and applied to the wind turbine. Typically, the control unit may select the parameter according to a predetermined scheme.

In block 630, the one or more selected operational parameters are applied to the wind turbine. According to some embodiments, the selected operational parameter is used to influence and change the operation of the wind turbine, for instance in order to maximize the energy yield and/or to equalize the load on the support structure over different angular positions of the nacelle with respect to the tower axis. In one embodiment, the pitch angle is selected as the operational parameter and the corresponding value of the pitch angle as present in the data set in dependence of the angular position is applied to the wind turbine.

Figure 10:
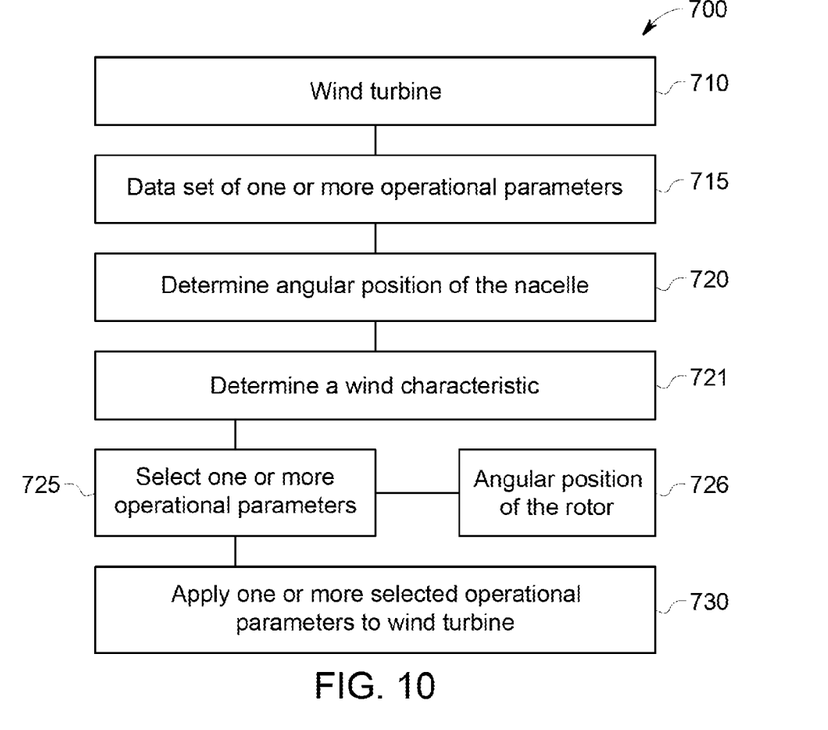
FIG. 10 is a schematic flow chart of a method of operating a wind turbine according to embodiments described herein.

According to some embodiments, selecting an operational parameter of the wind turbine depends on the determined actual angular position of the nacelle with respect to the tower axis. Generally, the data set of one or more operational parameters as referred to herein is dependent on the angular position of the nacelle and may also be dependent on a wind characteristic and/or sea state data. In FIG. 10, an embodiment of such a method for operating a wind turbine is shown. Generally, the blocks 710, 715, 720, 725, and 730 may correspond to the blocks 610, 615, 620, 625, and 630, respectively. In the example of FIG. 10, block 721 stands for determining a wind characteristic, as described in detail above, for instance by measurement devices. Further, block 721 is further specified by block 726. In block 726, selecting the one or more operational parameter includes selecting the one or more operational parameters dependent on the angular position of the rotor and the determined wind characteristic. Typically, the wind characteristic may be determined as described in detail above.

According to one embodiment, block 721 may include determining sea state data. Sea state data as used herein may include sea characteristics like wave height, wave frequency, sea current occurrence, sea current velocity, sea current direction and the like. Typically, one or two measuring devices may be used in order to determine the sea characteristic and obtain sea state data. Generally, one or more wind turbines of an offshore wind turbine farm may share the measurement devices for measuring sea characteristics. In some embodiments, block 726 may include selecting the one or more operational parameters dependent on the angular position of the rotor and dependent on the determined sea state data. In one example, the operational parameter may be selected dependent on the determined wind characteristic and the determined sea state data. In another example, the operational parameter may be selected dependent on the determined wind characteristic or the determined sea state data. Typically, the sea state data can be taken into account when selecting and applying the operational parameter of the wind turbine in the same way the wind characteristic is taken into account when selecting and applying an operational parameter, as described above. In particular, the wind roses exemplarily shown in FIGS. 6 and 7 may also be used as a diagram for displaying the sea state around the wind turbine. Thus, the wind roses showing as an example the wind velocity in FIGS. 6 and 7, may, in another example, show the sea current velocity, the wave height or the like.

In one example, the operational parameter of the wind turbine is applied to the wind turbine by sending and receiving respective control signals for the operational parameter, which may result in an increase or a decrease of the operational parameter, as desired. It should be understood that the operational parameter, which is included in the data set of operational parameters may be any operational parameter, such as an operational parameter as described above. In particular, the operational parameter to be selected may typically be an operational parameter, which influences the load on the support structure of the wind turbine.

In one example, the operational parameter is set by increasing or decreasing the pitch angle. Further, in one example, the torque of the rotor may be increased or decreased, when influencing an operational parameter, e.g. via the generator.

According to some embodiments, selecting an operational parameter or applying the selected operational parameter from the data set of operational parameters may include a reference to another data set of one or more operational parameters. For instance, the data set of operational parameters being dependent on the angular position of the nacelle may be a look-up table pointing at a certain angular position of the nacelle to another look-up table containing further operational parameters or a curve describing the operational parameter in dependence on other data. According to one embodiment which may be combined with further embodiments described herein, an operational parameter in the data set of operational parameters dependent on the angular position of the nacelle may be a function. Typically, the operational parameter in the data set may be a function of a wind characteristic, such as the wind direction, the wind velocity, the air density or the like.

Figure 11:
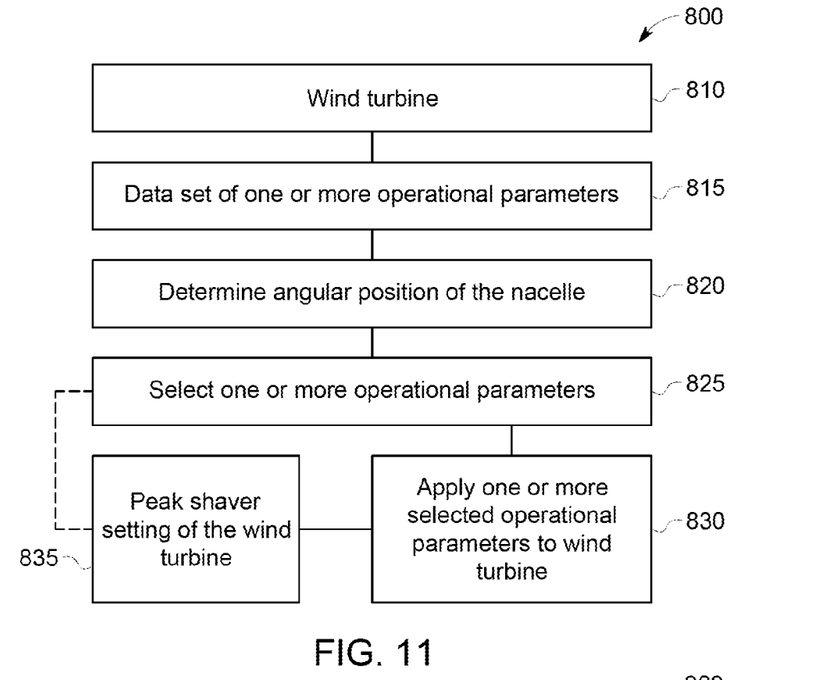
FIG. 11 is a schematic flow chart of a method of operating a wind turbine according to embodiments described herein.

According to some embodiments, which may be combined with other embodiments described herein, the method of operating a wind turbine as described above may include adapting the peak shaver settings of the wind turbine dependent on the yaw angle. Such a method is schematically shown in the flow chart of FIG. 11. Blocks 810, 815, 820, 825, and 830 may typically correspond to blocks 610, 615, 620, 625, 630, or 710, 715, 720, 725, and 730, respectively. In FIG. 11, block 835 specifies applying the one or more selected operational parameters by adapting a peak shaver setting of the wind turbine during operation of the wind turbine dependent on the yaw angle. According to some embodiments described herein, the operational parameter may be selected so as to influence the peak shaver setting. According to other embodiments described herein, block 825, i.e. selecting the operational parameter to be applied, may be specified by adapting a peak shaver setting of the wind turbine, as illustrated by dashed lines in FIG. 11.

For instance, relatively benign loading for certain wind directions (i.e., also for certain yaw angles) allows for less stringent peak shaver settings. In one embodiment, in which the pitch angle is selected as an operational parameter from the data set of operational parameters, this may result in a smaller pitch angle, which in turn increases the energy yield.

As described above, in some embodiments, the wind turbine may include a yawing part being yaw angle variable around a yaw axis (or a tower axis) and a support structure for supporting the yawing part of the wind turbine, as described above. According to one embodiment of operating the wind turbine, applying or selecting the operational parameter from the data set of operational parameters further includes adapting the peak shaver settings for reaching a higher energy capture within the given strength of the support structure of the wind turbine compared to the energy capture of a wind turbine having peak shaver settings without the data set of one or more operational parameters dependent on the angular position of the nacelle. Typically, the strength of the support structure is thus exploited in a more effective way than in a method of operating a wind turbine as known in the art. The existing strength of the support structure may be used to a greater extent when using the method according to embodiments described herein compared to using methods as known in the art. Generally, less stringent peak shaver settings according to embodiments described herein allow for higher fatigue overturning moments on the main bearing and the tower that would be compensated by the lower frequency or turbulence for the particular wind sector (that means also for the particular angular position of the nacelle). Typically, effects of fatigue can be postponed or the support structure of the wind turbine can be used more effectively (i.e., avoiding over-dimensioned support structure) by using the method and the wind turbine according to embodiments described herein.

Typically, the effects of adapting the peak shaver settings according to the data set of operational parameters being dependent on the angular position of the nacelle also allows for adapting the non-rotating structure of the wind turbine. In other words, the non-rotating structure of the wind turbine (also denoted as the support structure of the wind turbine) may be adapted to the method of operating a wind turbine according to the data set of operational parameter dependent on the angular position of the nacelle (thus, in one example described above, data being dependent on the wind direction) and the adapted peak shaver settings.

Figure 12:
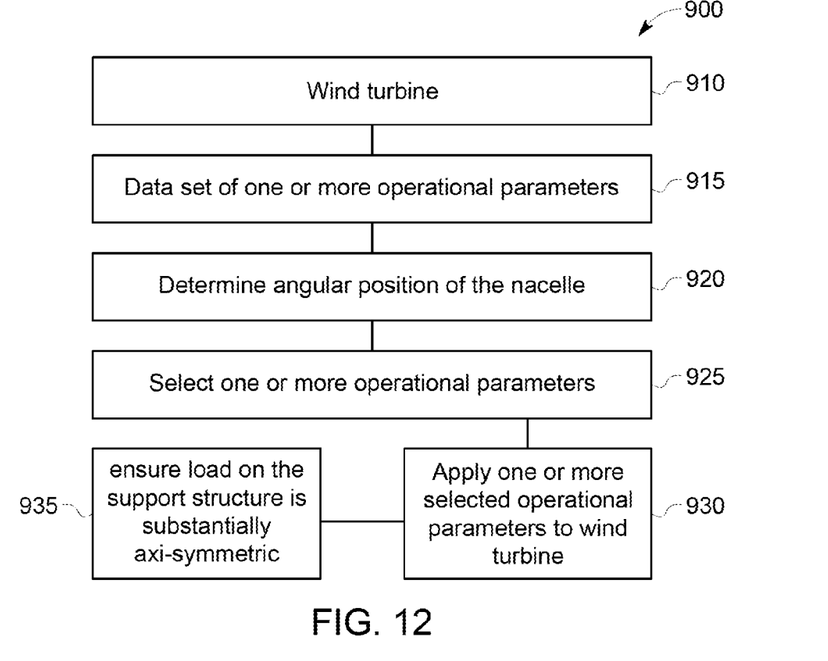
FIG. 12 is a schematic flow chart of a method of operating a wind turbine according to embodiments described herein.

In FIG. 12, a method of operating a wind turbine is shown according to some embodiments, which may be combined with other embodiments described herein. Generally, blocks 910, 915, 920, 925, and 930 may typically correspond to blocks 610, 615, 620, 625, 630, or 710, 715, 720, 725, 730, or 810, 815, 820, 825, 830 respectively. Typically, block 935 further specifies block 930 of method 900. In Block 935, applying the one or more selected operational parameters is performed so that the load on the support structure is substantially axi-symmetric with respect to the tower axis of the wind turbine during operation of the wind turbine, which is explained in detail above with respect to FIGS. 3 to 5.

Typically, selecting and applying the operational parameter of the wind turbine dependent on the yaw angle, as described in one embodiment above, may help to reach a substantially axially symmetric load distribution on the support structure of the wind turbine, such as non-yawing components of the wind energy, which may be the tower, bearings of the wind turbine and the like.

According to some embodiments, which may be combined with other embodiments described herein, the operational parameter of the wind turbine is selected and applied so that the load on the support structure is substantially independent from the wind direction. For instance, as explained in detail above, by selecting and applying the pitch angle (as an example of an operational parameter of the wind turbine) dependent on the determined actual angular position of the nacelle of the wind turbine, the load on the support structure may be equalized over the different angular positions of the nacelle. In other words, the difference between the load on the support structure at different angular positions of the nacelle is decreased compared to a wind turbine in which the operational parameter is set independent from the angular position.

The above-described systems and methods facilitate the optimization of the power capture by adapting the load control to the angular position of the nacelle. More specifically, embodiments described herein allow for less stringent peak shaver settings, which may further increase the energy yield, and also leads to a better utilization of the structural strength of the non-yawing components of the wind turbine. Further, the design of the non-yawing components of the wind turbine may be adapted so as to fit better to the actual load, thereby avoiding over-dimensioning of the support structure of the wind turbine.

Exemplary embodiments of systems and methods for operating and controlling a wind turbine are described above in detail. The systems and methods are not limited to the specific embodiments described herein, but rather, components of the systems and/or steps of the methods may be utilized independently and separately from other components and/or steps described herein. For example, the method of operating a wind turbine is not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine, the wind turbine including a yawing part being yaw angle variable about a yaw axis of the wind turbine, a support structure for supporting the yawing part of the wind turbine, and a load control for controlling an operational parameter of the wind turbine having an influence on the load on the support structure of the wind turbine, the method comprising:
    determining a wind direction;
    determining a yaw angle;
    adjusting the load control during operation of the wind turbine in an operating envelope of wind velocities from 3 m/s to 25 m/s dependent on the wind direction and the yaw angle, including:
    using the yaw angle to determine an actual position of the wind turbine within a non-symmetric wind velocity distribution pattern around the wind turbine;
    accessing stored data related to the non-symmetric wind velocity distribution pattern; and
    based on the stored data and the actual position of the wind turbine, adjusting the operational parameter to achieve substantially axi-symmetric fatigue loading of the support structure with respect to the yaw axis of the wind turbine within the non-symmetric wind velocity distribution pattern during operation of the wind turbine in the operating envelope.

2. The method according to claim 1, wherein the load control is a peak shaver.

3. The method according to claim 1, wherein the operational parameter of the wind turbine comprises at least one parameter of the group consisting of: the pitch angle, the rotational speed of the rotor, the torque of the rotor, and the power.

4. A method for operating a wind turbine, the wind turbine including a tower having a tower axis, support structure, and a nacelle being rotatable about the tower axis, the method comprising:
    a) providing a data set of one or more operational parameters of the wind turbine for operation of the wind turbine in an operating envelope of wind velocities from 3 m/s to 25 m/s, wherein the one or more operational parameters depend on the angular position of the nacelle with respect to the tower axis within a non-symmetric wind characteristic distribution pattern;
    b) determining an angular position of the nacelle with respect to the tower axis;
    c) selecting one or more operational parameters from the data set of one or more operational parameters of the wind turbine depending on the determined angular position of the nacelle; and,
    d) applying the one or more selected operational parameters to the wind turbine, wherein the selected operational parameter is computed based on stored data related to the non-symmetric wind characteristic distribution pattern to achieve substantially axi-symmetric fatigue loading of the support structure with respect to a yaw axis of the nacelle within the non-symmetric wind characteristic distribution pattern during operation of the wind turbine in the operating envelope.

5. The method according to claim 4, wherein the wind characteristic comprises at least one characteristic of the group consisting of: the wind direction, the wind velocity, the wind turbulence, the air density, the air temperature, wind shear characteristics, the mean wind occurrence, the upflow and downflow characteristic of the wind, and site-specific wind data.

6. The method according to claim 4, wherein the wind turbine further includes a yawing part being yaw angle variable around the tower axis and the support structure supports the yawing part of the wind turbine, and
    wherein the wind turbine further includes a yaw angle control for controlling and determining the yaw angle, and
    wherein determining the angular position of the nacelle with respect to the tower axis comprises determining the actual wind direction and the yaw angle of the wind turbine.

7. The method according to claim 6, wherein applying the one or more selected operational parameters further comprises adapting a peak shaver setting of the wind turbine during operation of the wind turbine dependent on the yaw angle.

8. The method according to claim 7, wherein applying the one or more selected operational parameter further comprises adapting the peak shaver settings for reaching a higher energy capture within the given strength of the support structure of the wind turbine at the yaw angle compared to the energy capture of a wind turbine at the same yaw angle having same structural features and having peak shaver settings without the data set of one or more operational parameters dependent on the angular position of the nacelle.

9. The method according to claim 4, wherein the one or more operational parameters in the data set of one or more operational parameters of the wind turbine comprises at least one parameter of the group consisting of: the pitch angle, the rotational speed of the rotor, the torque of the rotor, and the power.

10. A wind turbine comprising:
    a) support structure, the support structure including a tower including a tower axis;
    b) a nacelle being rotatable about the tower axis;
    c) a determining device for determining an angular position of the nacelle with respect to the tower axis; and,
    d) a control unit having a stored data set of one or more operational parameters of the wind turbine, wherein the one or more operational parameters depend on the angular position of the nacelle;
    wherein the control unit is adapted for selecting one or more operational parameters from the data set of one or more operational parameters of the wind turbine depending on the determined angular position of the nacelle and adjusting the one or more selected operational parameters based on stored data related to a non-symmetric wind velocity distribution pattern to achieve substantially axi-symmetric fatigue loading of the support structure with respect to the angular position of the nacelle within the non-symmetric wind velocity distribution pattern during operation of the wind turbine in an operating envelope of wind velocities from 3 m/s to 25 m/s.

11. The wind turbine according to claim 10, wherein the wind turbine includes at least one of a wind characteristic determining device for determining an actual wind characteristic and a measuring device for determining a sea state data.

12. The wind turbine according to claim 11, wherein the control unit is adapted for storing the data set of the one or more operational parameters dependent on the angular position of the rotor and at least one of the wind characteristic and the sea state data.

13. The wind turbine according to claim 10, wherein the wind turbine further comprises a pitch angle control for controlling the pitch angle of the wind turbine, and wherein the one or more selected operational parameters include the pitch angle.

14. The wind turbine according to claim 10, wherein the wind turbine further includes a yawing part being yaw angle variable around the tower axis and a support structure for supporting the yawing part of the wind turbine.

* * * * *